W. J. COCHRAN.
Car-Wheels.
No. 158,678. Patented Jan. 12, 1875.
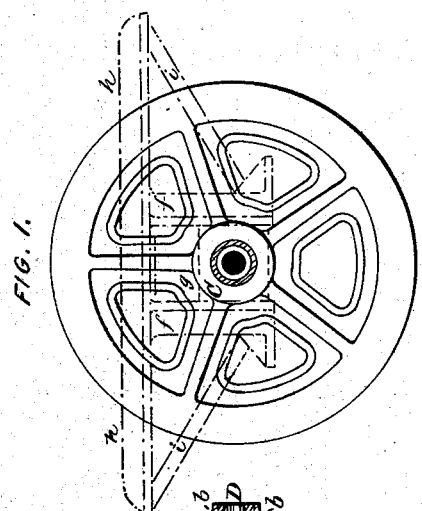
FIG. I.
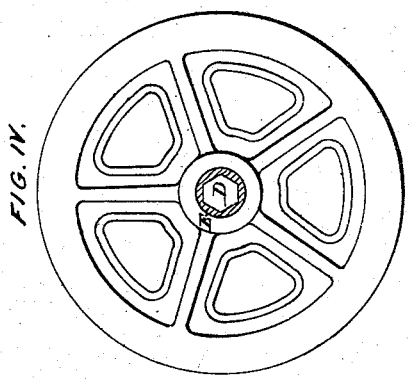
FIG. IV.
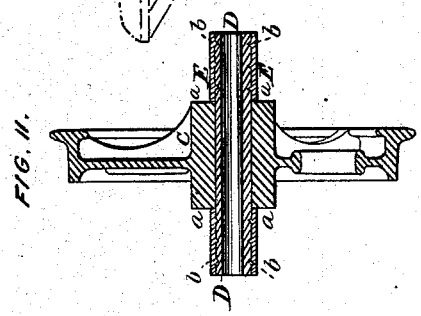
FIG. II.
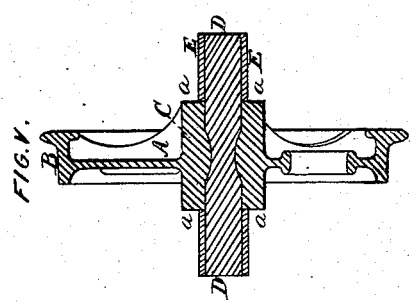
FIG. V.
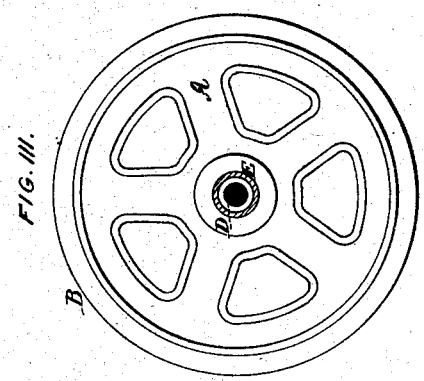
FIG. III.
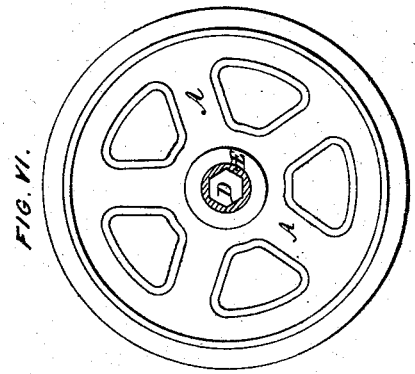
FIG. VI.
FIG. VII.
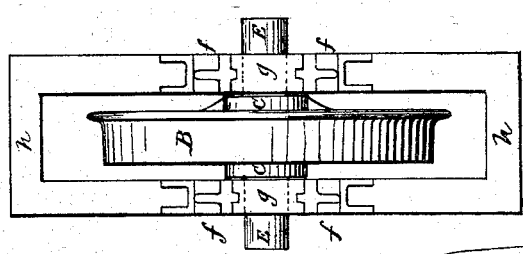
WITNESSES:
J. E. Coombs
A. K. Norris.
INVENTOR:
William J. Cochran
By James L. Norris,
his atty.

UNITED STATES PATENT OFFICE.

WILLIAM J. COCHRAN, OF BALTIMORE, MARYLAND.

IMPROVEMENT IN CAR-WHEELS.

Specification forming part of Letters Patent No. 158,678, dated January 12, 1875; application filed December 12, 1874.

*To all whom it may concern:*

Be it known that I, WILLIAM J. COCHRAN, of Baltimore, in the county of Baltimore and State of Maryland, have invented certain new and useful Improvements in Wheels for Street-Railway Cars, of which the following is a specification:

This invention has for its object to produce a light wheel, designed especially for street-railroad cars, and so constructed and fitted that each wheel will revolve or turn independently of the others, so as to facilitate the turning of curves, &c.

The invention consists in providing a wheel, having its hub portion projecting on both sides of the web, with a short axle, which is made either tubular or solid, and either of wrought or cast iron, the projecting ends of the axle serving as journals, which are covered with anti-friction or chilled metal sleeves, and fitted to revolve in boxes located on both sides of the wheel. The entire hub or the end of the same, which revolves in contact with the axle-boxes, is chilled, so as to prevent the wearing of the same by frictional contact.

In the accompanying drawings, Figure 1 is a side elevation of a car-wheel, with its box and car pedestals shown in dotted lines. Fig. 2 is a vertical sectional view of a wheel having a tubular axle or journals. Fig. 3 is a face view of the wheels. Fig. 4 is a face view of a car-wheel having a solid axle with polygonal journals for the retention of a cylindrical sleeve. Fig. 5 is a sectional view of such a wheel. Fig. 6 is a rear face view of the same. Fig. 7 represents the arrangement of a car-wheel made according to my invention, in respect to a pair of journal-boxes.

A represents the web, and B the tread or rim portion, of a car-wheel of the general form shown in a patent granted to me March 19, 1874, No. 148,669.

The hub C is extended beyond or made to project from both sides of the web of the wheel, and its entire exposed surface may be chilled, or only the ends *a*, as may be found preferable.

Instead of fitting a pair of wheels on a single long axle it is proposed to make each wheel independent, and to provide an axle therefor, the projecting portions D D of which serve as journals.

The axle shown in Figs. 1, 2, and 3 is made tubular, for the sake of lightness, and also to cause it to serve as a conductor for lubricants.

A solid axle is illustrated in Figs. 4, 5, and 6, the ends or journal portions of the same being made polygonal, for the purpose of retaining firmly a sleeve, E, of Babbitt anti-friction metal, chilled iron, or steel.

The tubular axle, which may be of wrought-iron, and of a cylindrical form, is entered into the mold employed in casting the wheel, and then, by casting the body or hub of the wheel around the same, it is firmly secured or embedded in the mass of metal. The solid axle is secured in a similar manner, and it may also be provided with a depression or reduced central portion for causing the metal of the center of the hub-bore to project and enter said depression, as shown in Fig. 5, for securing a more firm connection of the axle with the hub. A similar result may be effected by making the entire axle of a polygonal form.

The journals of the tubular axle are represented as being provided with indentations, depressions, or openings *b*, for the purpose of securely holding the anti-friction sleeves cast on the same, as the metal of the latter will enter the indentations or openings.

A wheel provided with a pair of projecting journals, as described, is located between an outside and inside box, as represented in Figs. 1 and 7, the journals revolving or turning in bearings of the usual construction.

The letters *f f*, in Figs. 1 and 7, designate the box-pedestals: *g*, the vertically-sliding box; *h*, the pedestal, and *i* the pedestal-braces.

The ends of the hub may or will revolve in contact with the boxes, and it is for preventing the wearing away of the hub by this frictional contact that it is chilled or case-hardened either throughout its entire length or only at its ends.

The tubular axle can serve as a lubricator or conductor, for by opening the outside box the lubricating-oil can be ejected through the axle into the inside box.

What I claim is—

A car-wheel having a journal at each side covered with sleeves of anti-friction or hard metal, substantially as described.

In testimony that I claim the foregoing I have hereunto set my hand.

WM. J. COCHRAN.

Witnesses:
JAMES L. NORRIS,
A. H. NORRIS.